United States Patent [19]

Grare

[11] Patent Number: 4,621,389
[45] Date of Patent: Nov. 11, 1986

[54] WINDSCREEN WIPER DEVICE

[75] Inventor: Regis M. Grare, Gif Sur Yvette, France

[73] Assignee: Equipements Automobiles Marshall, Issy-Les-Moulineaux, France

[21] Appl. No.: 719,118

[22] Filed: Apr. 2, 1985

[30] Foreign Application Priority Data

Apr. 6, 1984 [FR] France .................................. 84 05500

[51] Int. Cl.$^4$ .............................. B60S 1/34; B60S 1/40
[52] U.S. Cl. ............................. 15/250.23; 15/250.32; 15/250.35
[58] Field of Search ........... 15/250.21, 250.23, 250.35, 15/250.32

[56] References Cited

U.S. PATENT DOCUMENTS 4,512,056  4/1985  Wattier .............................. 15/250.23
4,525,891  7/1985  Leroy et al. ..................... 15/250.23

Primary Examiner—Peter Feldman
Attorney, Agent, or Firm—Brisebois & Kruger

[57] ABSTRACT

A windscreen wiper device, in particular for a single blade or double blade assembly, comprises for at least one of the blades, firstly a main wiper arm articulated at one end on a hinge pin, this main wiper arm being provided at its other end with a rocker and, secondly, an auxiliary arm articulated at one end on a portion of the rocker and at its other end, on a clevis pin substantially parallel to the hinge pin of the main wiper arm. The clevis pin of the auxiliary arm is displaced in relation to the geometrical axis of rotation of its clevis joint, along a central longitudinal direction of this arm by a distance sufficient to allow the assembly of the main wiper arm and of the auxiliary arm to be raised in the normal way by removing it from the surface to be wiped by rotation around the said clevis and hinge pin.

14 Claims, 3 Drawing Figures

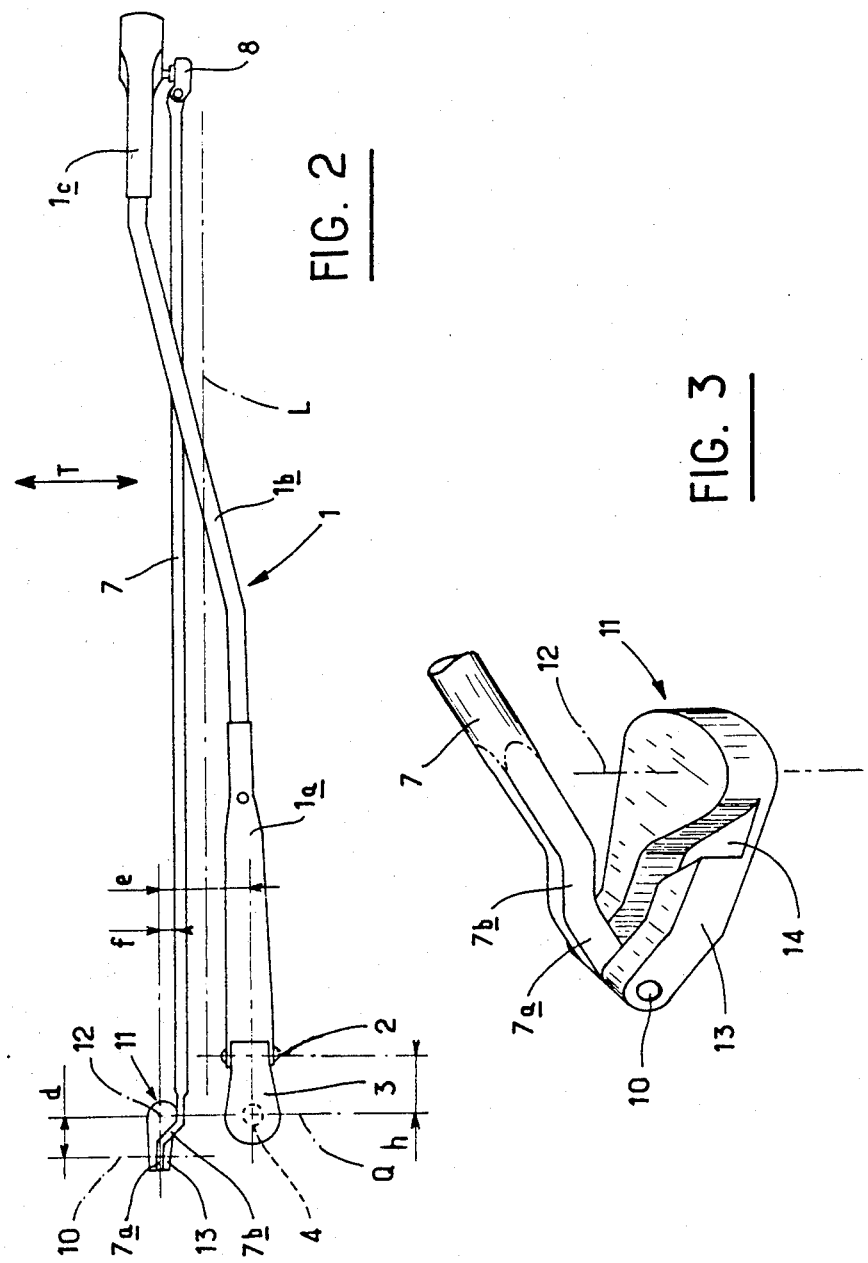

WINDSCREEN WIPER DEVICE

BACKGROUND OF THE INVENTION

The invention relates to a windscreen wiper device, in particular one with a single blade or double blades in which for at least one of the blades there is (a) a main wiper arm articulated at one end on a pin carried by a drive hub which is fixed for rotation on a drive shaft substantially orthogonal to the centre plane of a surface to be wiped, this main wiper arm being provided at its other end with a rocker articulated to the main arm and carrying a windscreen wiper blade which is itself articulated on the rocker and (b) an auxiliary arm articulated at one end on a portion of the rocker and at its other end, on a pin substantially parallel to the hinge pin of the main upper arm whereby, during the alternating rotation of the main arm, the auxiliary arm drives the rocker to rock and generate a non-circular blade trajectory. The hinge pin of the auxiliary arm at the end remote from the rocker is carried by a clevis joint which can turn around a geometrical axis substantially parallel to the said drive shaft but is displaced in relation thereto along a direction transverse to the central longitudinal direction of the main arm and thus generates the rocker moving action.

PRIOR ART

A windscreen wiper device of this kind is known, for instance, according to the international published application WO No. 83/01043. Such a device makes it possible, with low cost additional means, to increase to a significant extent the surface wiped by the windscreen wiper blade.

However, a problem arises when changing the windscreen wiper blade or when cleaning the surface to be wiped, for example the windshield.

It is known that, in windscreen wiper devices, with a view to changing the windscreen wiper blade, or cleaning the surface to be wiped, the wiper arm can be raised or "disengaged", that is to say, removed from the surface to be wiped, by rotation around an axis. This "disengaged" position is a stable position wherein the wiper arm is kept away from the surface to be wiped.

In the case of the "non-circular path" type of windscreen wiper device the presence of an auxiliary arm mounted on a clevis link displaced in relation to the drive shaft of the main arm and articulated on the rocker which is itself connected to the main arm, creates difficulties for the blade raising or "disengaging" action.

In the fittings proposed to date for such windscreen wiper devices comprising a main arm, an auxiliary arm and a rocker, it is not possible to obtain a simultaneous complete raising or "disengagement" of the main arm and of the auxiliary arm for removing the windscreen wiper blade from the surface to be wiped without causing jamming or binding after a certain raising angle or without having to effect preliminary dismantling of the articulations connecting the various elements. The complete raising of the main arm through an angle exceeding 45° is excluded, in the case where an auxiliary arm is present, whilst such raising is usual when one wishes to change a windscreen wiper blade on a windscreen wiper device comprising one single arm, or even just to clean the windscreen.

In spite of everything, in the known windscreen wiper devices comprising a main arm, an auxiliary arm and a rocker, it is generally possible to remove the main arm and the auxiliary arm simultaneously through an adequate angle in relation to the surface to be wiped, in order to make it possible to withdraw the windscreen wiper blade with a view to changing it. However, in that case, the position taken up is unstable and it is necessary to hold the assembly manually during the whole intervention. If this raising angle, which is less than 45° is exceeded there is a risk of deforming and distorting the components of the device, especially the auxiliary arm and main arm.

The installation of stop systems preventing the user from raising the main arm and the auxiliary arm beyond a determined angle has been tried. Installing such stop systems is relatively difficult and leads to various drawbacks, in particular, an increase in the mass of the windscreen wiper device, a questionable aesthetic appearance, and considerable extra expense.

Moreover, the effectiveness of such a stop system is doubtful. As a matter of fact, with windscreen wiper devices comprising a single arm, the users are accustomed to raising this arm by more than 45° in relation to the surface to be wiped when the wiper blade is changed. It can therefore come about that, because of his acquired habits, a user pulls on the main wiper arm of a wiper device comprising a main wiper arm and an auxiliary arm and continues his pulling exertion against the action of the stop system. If the user exerts his pull at the end of the main wiper arm provided with the rocker, the leverage is considerable in relation to the stop system, and both the main wiper arm and the auxiliary arm can be deformed during this movement.

SUMMARY OF THE INVENTION

The object of the invention is to provide a windscreen wiper device comprising a main wiper arm, an auxiliary arm, and a rocker, which should more readily meet the various requirements of practical use than hitherto and which should, above all, allow the windscreen wiper blade to be changed simply and quickly without risk of deformation or of damage to the main arm and/or to the auxiliary arm without having to install a special stop system.

Accordingly the invention provides a windscreen wiper device comprising:
 (a) at least one wiper blade;
 (b) a main wiper arm for carrying said at least one blade;
 (c) a drive hub for said main wiper arm;
 (d) a hinge pin carried by said drive hub and articulating a first end of said main wiper arm to said drive hub;
 (e) a drive shaft adapted to be mounted for rotation on a drive shaft substantially orthogonal to the center plane of a surface to be wiped;
 (f) rocker means carried by the second end of said main wiper arm;
 (g) means articulating said rocker means to said second end of the main wiper arm;
 (h) means for articulating a wiper blade to said rocker means;
 (i) an auxiliary arm having first and second ends;
 (j) means articulating said first end of the auxiliary arm on a portion of the rocker means;
 (k) a clevis joint mounted for rotation around a geometrical axis substantially parallel to that of said drive shaft but displaced in relation to the latter along a direction transverse to the central longitudinal direction of the main wiper arm; and (l) clevis pin means carried by said clevis joint substantially parallel to said hinge pin carrying the main wiper arm; whereby during alternating rotation of the main wiper arm the rocker means rocks and displaces the blade along the direction of the main wiper arm to produce a non-circular trajectory of the blade; said clevis pin means being displaced in relation to said geometrical axis of rotation of the clevis joint along the longitudinal direction of said main wiper arm by a distance which allows the assembly comprising the main wiper arm and the auxiliary arm to be raised in the normal way by rotation around said hinge pin of the main wiper arm and the clevis pin means for the auxiliary arm, to remove them from the surface to be wiped.

The expression "raise in the normal way" is to be understood in the sense that the raising of the main wiper arm and of the auxiliary arm has an amplitude comparable to that of raising the conventional windscreen wiper arm during the operation of changing the windscreen wiper blade; this raising angle is at least 45° in relation to the position wherein the blade bears against the surface to be wiped, and preferably it is of the order of 80° the main arm.

Usually, the auxiliary arm in a zone adjacent its first end, is situated below the main wiper arm, that is to say, it is located between the main arm and the surface to be wiped; the clevis pin articulating the auxiliary arm is then displaced in relation to the geometrical axis of rotation of the clevis joint, so as to be located on the opposite side of the main arm in relation to the said geometrical axis of rotation of the clevis joint.

The geometrical axis of rotation of the clevis joint can be situated in a plane passing through the axis of the drive shaft and orthogonal to the central longitudinal direction of the main wiper arm when the blade is in contact with the surface to be wiped: the clevis joint advantageously comprises an extension directed towards the side to which the hinge pins are to be displaced, provision being made for the clevis pin to be disposed towards the distal end of this extension.

The clevis joint for the auxiliary arm may include a recess such as a slot or groove capable of accommodating and guiding the portion of the auxiliary arm situated adjacent the clevis joint when the auxiliary arm is located near the surface to be wiped and the windscreen wiper blade bears against said surface.

BRIEF DESCRIPTION OF THE DRAWINGS

Other objects and advantages of the present invention will be discussed in greater detail below, in relation to a particular mode of embodiment described with reference to the accompanying drawings but which is in no way restrictive. In the drawings:

FIG. 2 is a plan view in relation to FIG. 1 of the main wiper arm and of the auxiliary arm in the low positions; and FIG. 3 is a detailed perspective representation of the clevis joint for the auxiliary arm.

DESCRIPTION OF THE PREFERRED EMBODIMENT

Figure 1:
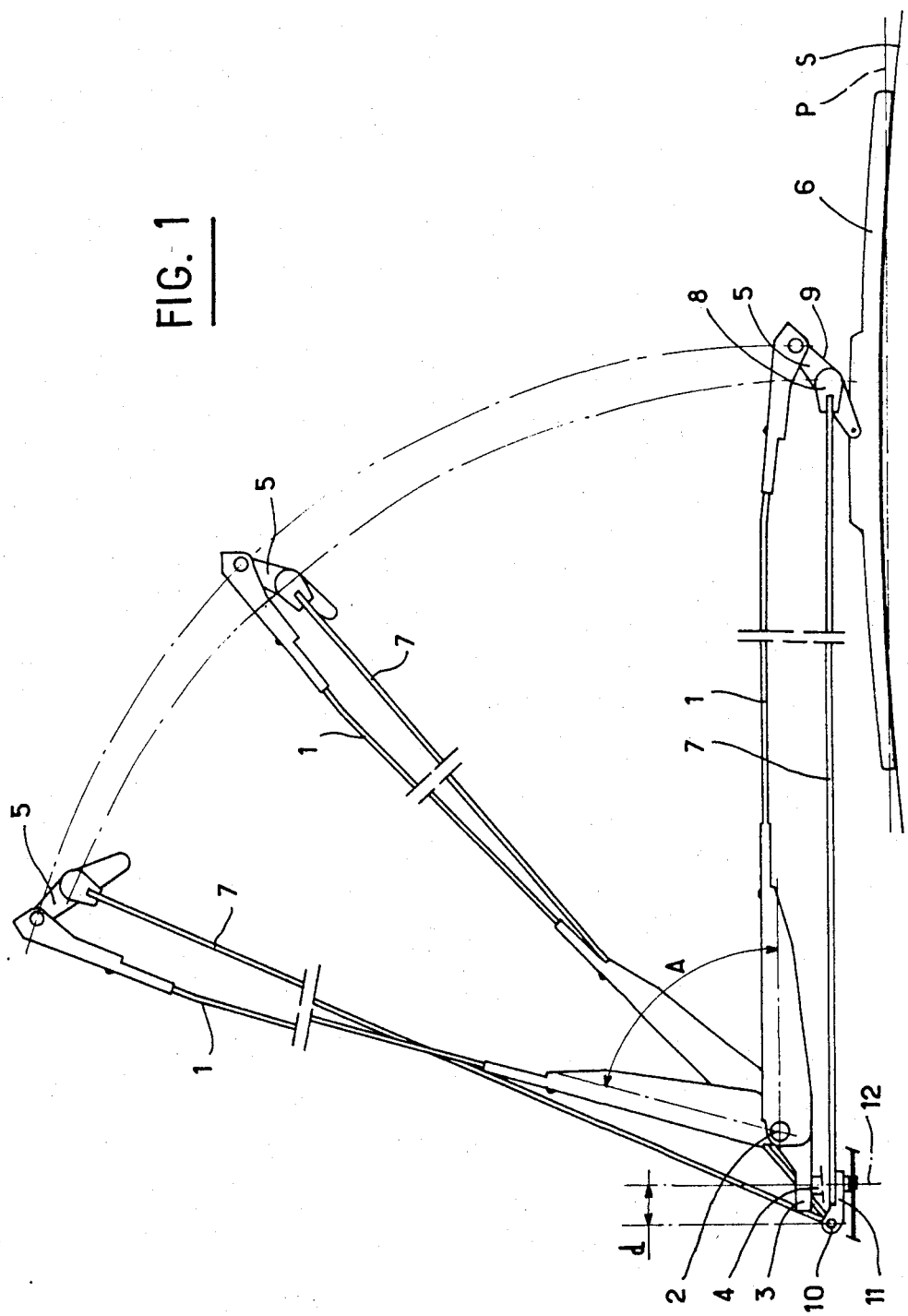
FIG. 1 is a view in a lateral elevation of a windscreen wiper device in accordance with the invention, showing the main wiper arm and the auxiliary arm in a low position, a raised position, an intermediate position.

Referring to the drawings, a windscreen wiper device may be seen comprising a main wiper arm 1 articulated at one end on a pin 2 substantially parallel to the centre plane P of a surface S to be wiped. Surface S is represented schematically; it is generally constituted by the surface of a windscreen. Pin 2 is carried by a drive hub 3 which is fixed for rotation on a drive shaft 4 substantially orthogonal to the above mentioned center plane P. The drive shaft 4 can be caused to rotate alternately around its geometrical axis by "motor" means which are not shown. The main wiper arm 1 is provided at its other end with a rocker 5 which is articulated at one of its ends on arm 1. The other end of rocker 5 has an articulation supporting a windscreen wiper blade 6. The rocker as a whole is generally situated between surface S and main wiper arm 1.

The windscreen wiper device also comprises an auxiliary arm 7 articulated at one end 8 to a part 9 of the rocker, in particular by means of a ball hinge joint. According to the embodiment of the drawing, this part 9 of rocker 5 is an intermediate part situated between the hinge pin of the rocker on main wiper arm 1 and the hinge pin of the blade 6 on rocker 5. The auxiliary arm 7 is articulated at its other end on a clevis pin 10 which is substantially parallel with the hinge pin 2 of the main wiper arm 1. Clevis pin 10 of the auxiliary arm is carried by a clevis joint 11 which can turn around a geometrical axis 12 which is substantially parallel to that of the drive shaft 4. As may be seen in FIG. 2 this axis 12 is displaced in relation to shaft 4 by a distance e along a direction T designated by a double arrow transverse to the central longitudinal direction L of the main wiper arm 1.

It is known that, with such an assembly, rocker 5 rocks during the alternating rotation of the main wiper arm 1 on shaft 4 and of the auxiliary arm 7 rotating around the geometrical axis 12, for a given angle of rotation. During this rocking, the intermediate portion 9 of the rocker which is retracted in relation to the end of main wiper arm 1 in the blade engaged position represented in FIG. 1, passes beyond the said end of arm 1 and moves the blade 6 away from shaft 4. There follows from this a non-circular trajectory of blade 6 and an increase in the surface wiped.

To allow the main wiper arm 1 and the auxiliary arm 7 to be raised or "disengaged" simultaneously, as illustrated in FIG. 1, in particular with a view to changing the windscreen wiper blade 6, the clevis pin 10 of the auxiliary 7 arm is displaced in relation to the geometrical axis of rotation 12 of clevis joint 11 along the central longitudinal direction L of the main wiper arm 1 in one direction and through a distance d (FIG. 2) so that one may raise the assembly of the main wiper arm 1 and of the auxiliary arm in the normal way by removing them from the surface S to be wiped by rotation around the said hinge pin 2 and clevis pin 10.

By the expression "raise in the normal way" it is intended that the raising of the main arm 1 has an angular amplitude A (FIG. 1) comparable to that of the raising of a single conventional arm of a windscreen wiper device during the operation of changing the windscreen wiper blade. This angle A is at least 45° in relation to the "engaged" position in which the blade 6 bears against surface S; preferably, angle A is of the order of 80° for the main wiper arm 1.

As may be seen in FIG. 2, main wiper arm 1 has its end 1c remote from drive shaft 4 offset in relation to this shaft. Main wiper arm 1 has a first portion 1a extending from the hinge pin 2 parallel to direction L; this first portion 1a is followed by an intermediate portion 1b inclined in relation to direction L so as to turn towards that side of the portion 1a at which the clevis pin 10 of the auxiliary arm 7 is located. This intermediate portion passes over the auxiliary arm 7 and is extended by the end portion 1c of arm 1 again parallel to direction L. Rocker 5 is articulated on the end of this end portion 1c arranged in the form of a clevis joint.

The auxiliary arm 7 is rectilinear over most of its length and is situated in its region next to the rocker 5 below main wiper arm 1. As appears in the plan view of FIG. 2, arms 1 and 7 cross, with the first main arm portion 1a situated on one side of the auxiliary arm 7 whilst the other end portion 1c is situated on the other side of the auxiliary arm.

The clevis pin 10 is displaced in relation to pin 12 so as to be on the side away from the main wiper arm 1; in other words as viewed in FIG. 2, clevis pin 10 is displaced towards the left in relation to the axis of rotation 12 of clevis joint 11.

This geometrical axis of rotation 12 can be situated in a plane Q (FIG. 2) passing through the geometrical axis of drive shaft 4 and orthogonal to the central longitudinal direction L of arm 1 (when blade 6 contacts the surface S). Clevis joint 11 comprises an extension 13 to provide the desired displacement d. In the embodiment shown in the drawings the extension 13 is on the opposite side from main wiper arm 1 so that clevis pin 10 should be offset behind plane Q, main wiper arm 1 being considered as being situated ahead of this plane. Hinge pin 2 of the main upper arm 1 is situated at a distance h (FIG. 2) from the axis 12 and from plane Q on the opposite side from clevis pin 10. Distance d can be of the same order of magnitude as distance h.

As may be seen in FIGS. 2 and 3, the end 7a of auxiliary arm 7 articulated at clevis joint 11, is transversely offset by a distance f. This portion 7a, substantially parallel to the major part of the auxiliary arm 7, is joined to this major part by a transition zone 7b sloping in the opposite direction from the intermediate portion 1b of arm 1. The center line of end 7a is parallel to the direction L and intersects the axis of rotation 12 of the clevis joint.

As can be readily seen in FIG. 3, the clevis joint 11 may comprise a slot or a groove 14 capable of receiving and guiding the arm portion 7a and a part of the transition zone 7b of the auxiliary arm 7 when this auxiliary arm is situated near the surface S (the low or engaged position of FIG. 1). When the auxiliary arm is raised, the portions 7a and 7b emerge from the slot 14. The median line of groove 14 is a broken line forming an obtuse angle.

With such a windscreen wiper device, when a blade 6 is to be replaced, the main wiper arm 1 is raised from surface S in the conventional way, as represented in FIG. 1. The illustrated displacement of the clevis pin 10 of the auxiliary arm 7 behind clevis joint 11, allows the windscreen wiper device to be capable of complete raising movement as represented in FIG. 1. In the course of this movement the relative positions of the main wiper arm 1 and of the auxiliary arm 7 are altered, and the rocker 5 rocks but without in any way impeding the complete execution of the movement.

Displacement d is adapted to the geometry of the system and may, for example, exceed 1 cm.

The device according to the present invention uses a simple design whilst making it possible to avoid a deformation or distortion of either of the arms 1 and 7 when the blade 6 is changed.

The above described embodiment has the hinge pin 2 of the main wiper arm substantially parallel to the center plane P of the surface S to be wiped. However, this hinge pin 2 may form an angle and may even be at an inclination of about 30° in relation to the said center plane Q without departing from the invention. It suffices to incline the hinge pin 10 of the auxiliary arm 7 by an equivalent angle in relation to the centre plane Q to obtain a satisfactory wiping action.

I claim:

1. A windscreen wiper device for wiping a windscreen surface having a center plane, said device comprising:
    a drive shaft adapted to be mounted for rotation about an axis substantially orthogonal to the center plane of the surface to be wiped;
    at least one wiper blade;
    a main wiper arm having a first end and a second end;
    a drive hub for said main wiper arm;
    a hinge pine pivotally connecting the first end of said main wiper arm to said drive hub;
    said drive hub being adapted to be secured to said drive shaft for driving the wiper arm in response to rotation of the shaft;
    rocker means carried by the second end of said wiper arm;
    means pivotally connecting said rocker means to said wiper arm;
    means pivotally connecting said wiper blade to said rocker means;
    an auxiliary arm having first and second ends;
    means pivotally connecting said first end of the auxiliary arm on said rocker means;
    a clevis joint mounted for rotation around an axis substantially parallel to but offset from the axis of the drive shaft in a direction generally transverse to the length of the wiper arm;
    clevis pin means pivotally connecting said second end of said auxiliary arm to said clevis joint for pivotal movement about an axis substantially parallel to the axis of said hinge pin for said main wiper arm so that during oscillation of the main wiper arm the rocker means rocks and displaces the blade longitudinally of the main wiper arm to Produce a non-circular wiping path of the blade;
    said clevis pin means being spaced relative to the axis of rotation of the clevis joint, in a direction longitudinally of the wiper arm, by a distance to enable the assembly of the wiper arm, auxiliary arm, and wiper blade to be lifted substantially from the surface to be wiped by pivoting around said hinge and clevis pin means, without interference of the arms and rocker means with each other.

2. A windscreen wiper device according to claim 1 wherein said auxiliary arm has a portion adjacent asaid first end which is below said main wiper arm, and said clevis pin means is beyond said axis of rotation of the clevis joint, in a direction longitudinally of the wiper arm.

3. A device according to claim 1, wherein said hinge pin of the main wiper arm (1) is substantially parallel to any plane perpendicular to the axis of rotation of said drive shaft.

4. A device according to claim 1, wherein said hinge pin of the main wiper arm is inclined in relation to any plane perpendicular to the axis of rotation of said drive shaft.

5. A device according to claim 1 wherein the main wiper arm is able to be raised through an angle of at least 45° in relation to the position wherein the blade bears against surface to be wiped.

6. A device according to claim 5 wherein said angle is about 80°.

7. A windscreen wiper device according to claim 1, wherein said geometrical axis of rotation of clevis joint is situated in a plane which passes through the axis of said drive shaft and when the blade bears on the surface to be wiped, is orthogonal to the longitudinal direction of the main wiper arm, and wherein said clevis joint comprises an extension to the side of said geometrical axis of rotation at which the displacement of the clevis pin means relative to said hinge pin of the main wiper arm is required, said, the clevis pin means being positioned towards the distal end of the said extension.

8. A device according to claim 7, wherein said clevis joint comprises recess means capable of accommodating and guiding a portion of the auxiliary arm adjacent said second end thereof when the auxiliary arm is located near the surface to be wiped and the windscreen wiper blade bears against said surface.

9. A device according to claim 1, wherein said second end of the auxiliary arm is displaced transversely relative to the general longitudinal direction of the auxiliary arm.

10. A device according to claim 9, wherein the median line of said second end of the auxiliary arm is parallel to the central longitudinal direction of the main wiper arm and intersects the axis of rotation of said clevis joint.

11. A windscreen wiper device for wiping a windscreen surface having a center plane, said device comprising:
a drive shaft adapted to be mounted for rotation about an axis substantially orthogonal to the center plane of the surface to be wiped;
at least one wiper blade;
a main wiper arm having a first end and a second end;
a drive hub for said main wiper arm;
a hinge pin pivotally connecting the first end of said main wiper arm to said drive hub;
said drive hub being adapted to be secured to said drive shaft for driving the wiper arm in response to rotation of the shaft;
rocker means carried by the second end of said wiper arm;
means pivotally connecting said rocker means to said wiper arm;
means pivotally connecting said wiper blade to said rocker means;
an auxiliary arm having first and second ends;
means pivotally connecting said first end of the auxiliary arm on said rocker means;
a clevis joint mounted for rotation around an axis substantially parallel to but offset from the axis of the drive shaft in a direction generally transverse to the length of the wiper arm;
clevis pin means pivotally connecting said second end of said auxiliary arm to said clevis joint for pivotal movement about an axis substantially parallel to the axis of said hinge pin for said main wiper arm so that during oscillation of the main wiper arm the rocker means rocks and displaces the blade longitudinally of the main wiper arm to Produce a non-circular wiping path of the blade;
said clevis pin means being spaced relative to the axis of rotation of the clevis joint, in a direction longitudinally of the wiper arm, by a distance to enable the assembly of the wiper arm, auxiliary arm, and wiper blade to be lifted substantially from the surface to be wiped by pivoting around said hinge and clevis pin means, without interference of the arms and rocker means with each other;
wherein said axis of rotation of said clevis joint is in a plane which passes through the axis of said drive shaft and when the blade engages the surface to be wiped, is orthogonal to the longitudinal direction of the main wiper arm;
wherein said clevis comprises an outward extension on the side of the axis of rotation of the clevis joint on which the clevis pin means is spaced, and the clevis pin means is mounted on said extension; and
wherein said clevis comprises recess means for accomodating and guiding a portion of the auxiliary arm adjacent said second end, when said wiper blade is in a position engaging the surface to be wiped.

12. A device according to claim 11, wherein said recess means define a slot in the clevis joint.

13. A device according to claim 11, wherein said second end of the auxiliary arm is displaced transversely relative to the general longitudinal direction of the auxiliary arm and wherein said recess means define a groove having a median line which is angled to form an obtuse angle bend therein.

14. A device according to claim 11, wherein said second end of the auxiliary arm is displaced transversely relative to the general longitudinal direction of the auxiliary arm; wherein the median line of said second end of the auxiliary arm is parallel to the central longitudinal direction of the main wiper arm and intersects the axis of rotation of said clevis joint; and wherein said recess means define a groove having a median line which is angled to form an obtuse angle bend therein.

* * * * *